US010384487B2

(12) United States Patent
Goossen

(10) Patent No.: US 10,384,487 B2
(45) Date of Patent: Aug. 20, 2019

(54) DEVICE FOR HANDLING TIRES

(71) Applicant: Darcy Goossen, Feirntosh (CA)

(72) Inventor: Darcy Goossen, Feirntosh (CA)

( * ) Notice: Subject to any disclaimer, the term of this patent is extended or adjusted under 35 U.S.C. 154(b) by 0 days.

(21) Appl. No.: 15/444,154

(22) Filed: Feb. 27, 2017

(65) Prior Publication Data

US 2017/0259617 A1 Sep. 14, 2017

(30) Foreign Application Priority Data

Mar. 8, 2016 (CA) ...................... 2923047

(51) Int. Cl.
*B29D 30/00* (2006.01)
*B66C 1/42* (2006.01)
*B66C 1/54* (2006.01)
*B60B 30/02* (2006.01)
*B66F 9/18* (2006.01)

(52) U.S. Cl.
CPC ................ *B60B 30/02* (2013.01); *B66F 9/18* (2013.01); *B66F 9/184* (2013.01); *B66F 9/187* (2013.01); *B60B 2340/30* (2013.01)

(58) Field of Classification Search
CPC ... B60C 25/132; B60C 25/00; B60C 25/0515; B60C 25/0545; B60C 25/0596; B25J 15/10; B29D 30/0603; B29D 2030/0022; B29D 30/0016; B60B 29/002; B66C 1/44; B66F 9/184
See application file for complete search history.

(56) References Cited

U.S. PATENT DOCUMENTS

| 1,793,864 | A | | 2/1931 | Manley |
| 2,642,307 | A | | 6/1953 | Olson |
| 2,948,314 | A | | 8/1960 | Bishman |
| 3,145,997 | A | * | 8/1964 | Moses ............... B23B 31/16287 279/119 |
| 3,278,218 | A | | 10/1966 | Lebre |
| 3,830,388 | A | | 8/1974 | Mott |
| 3,858,735 | A | * | 1/1975 | Zrostlik ................. B60C 25/00 294/119.1 |
| 3,927,778 | A | | 12/1975 | Zrostlik |
| 3,970,342 | A | | 7/1976 | Cotton |
| 4,051,966 | A | | 10/1977 | Cotton |

(Continued)

*Primary Examiner* — Gregory W Adams
(74) *Attorney, Agent, or Firm* — Christensen O'Connor Johnson Kindness PLLC

(57) ABSTRACT

There is provided a device for handling tires having an anchor for attaching to a prime mover and a clamping device rotatably mounted to the anchor that rotates relative to the anchor about a rotation axis. The clamping device has a plurality of engagement members connected by a mechanical linkage and a carrying body with a plurality of guides. The weight distribution of the clamping device is balanced about the rotation axis. Each guide carries one of the engagement members and is oriented to allow the engagement members to move perpendicular to the rotation axis between clamping and release positions. The mechanical linkage includes a rotating actuator and controls movement of the engagement members along the guides. The movement of each engagement member is rotationally symmetric about the rotation axis relative to the movement of the other engagement members. The device has an actuator that actuates the mechanical linkage.

12 Claims, 8 Drawing Sheets

(56) References Cited

U.S. PATENT DOCUMENTS

| | | | |
|---|---|---|---|
| 4,190,406 A * | 2/1980 | Geck | B29D 30/0603 294/93 |
| 4,279,438 A | 7/1981 | Singh | |
| 4,395,209 A * | 7/1983 | Singh | B29D 30/0603 425/33 |
| 4,479,673 A * | 10/1984 | Inaba | B25J 15/10 269/118 |
| 4,527,942 A * | 7/1985 | Smith | B23Q 1/48 248/297.11 |
| 5,395,150 A | 3/1995 | Imler et al. | |
| 5,536,133 A * | 7/1996 | Velez | B66F 9/184 294/206 |
| 6,035,478 A | 3/2000 | Miller et al. | |
| 6,293,051 B1 | 9/2001 | Matye | |
| 6,435,805 B1 | 8/2002 | Smith | |
| 6,916,026 B2 * | 7/2005 | Meza | B23B 31/16 157/16 |
| 7,201,204 B2 * | 4/2007 | Corghi | B60C 25/0545 157/16 |
| 7,395,848 B2 * | 7/2008 | Bishop | B60C 25/132 157/1.17 |
| 7,699,087 B2 * | 4/2010 | Rogalla | B60C 25/0515 157/1.1 |
| 8,137,044 B2 | 3/2012 | Slee | |
| 8,161,650 B2 * | 4/2012 | Lawson | B60C 25/0515 157/16 |
| 8,910,985 B2 * | 12/2014 | Neeper | B25J 9/102 294/119.1 |
| 9,132,696 B2 | 9/2015 | Grengs | |
| 2004/0062607 A1 | 4/2004 | Harvey | |
| 2009/0035107 A1 * | 2/2009 | Duran | B25J 5/02 414/426 |
| 2010/0166531 A1 | 7/2010 | Bauer et al. | |
| 2014/0138502 A1 | 5/2014 | Hall | |
| 2014/0238127 A1 * | 8/2014 | Lawson | G01M 1/326 73/460 |
| 2015/0123416 A1 * | 5/2015 | Kitamura | B25J 15/0038 294/207 |
| 2015/0151576 A1 * | 6/2015 | Grengs | B60B 29/001 414/428 |

* cited by examiner

DEVICE FOR HANDLING TIRES

TECHNICAL FIELD

This relates to a device for handling tires, such as for removing and installing tires on machinery.

BACKGROUND

Industrial equipment, such as agricultural equipment, mining trucks, and construction equipment, frequently make use of large tires that cannot be easily manipulated by hand due to their size and weight. In order to move these large tires and to install and remove them from industrial equipment, specialized mechanical devices must be used. U.S. Patent Application Publication No. 2014/0138502, to Hall, teaches a tire handling apparatus for machinery, such as a front end loader, having movable arms that grip the tire and allow for manipulation of the tire.

SUMMARY

According to an aspect, there is provided a device for handling tires, comprising an anchor for attaching to a prime mover, a clamping device rotatably mounted to the anchor, the clamping device rotating about an axis of rotation relative to the anchor, the clamping device comprising a carrying body and a plurality of engagement members, the plurality of engagement members being connected by a mechanical linkage, the carrying body comprising a plurality of guides, the clamping device having a weight distribution that is balanced about the axis of rotation, wherein the guides are distributed circumferentially about the axis of rotation, each guide carrying one of the plurality of engagement members, the guides being oriented to allow the engagement members to move in a direction that is perpendicular to the axis of rotation between a clamping position and a release position, and the mechanical linkage comprises a rotating actuator that rotates about the axis of rotation relative to the carrying body and the anchor, the mechanical linkage controlling the movement of the engagement members along the guides, the movement of each engagement member being rotationally symmetric about the axis of rotation relative to the movement of the other engagement members, and an actuator that actuates the mechanical linkage.

According to another aspect, the anchor may comprise a pivot such that the clamping device is pivotally mounted to the prime mover.

According to another aspect, the anchor may comprise a releasable pivot lock for locking the pivot in a selected pivotal position.

According to another aspect, the pivot may have a pivot axis that is perpendicular to the axis of rotation.

According to another aspect, the guides may comprise arms that extend outward relative to the axis of rotation, and the engagement members may comprise sleeves that receive the arms.

According to another aspect, the guides may be linear.

According to another aspect, the mechanical linkage may comprise a rotating plate and a connecting link connected between the rotating plate and each engagement member, the connecting links converting the rotational movement of the rotating plate to linear movement of the engagement members along the guides.

According to another aspect, the actuator may be a linear actuator.

According to another aspect, the linear actuator may be connected between the carrying body and one of the engagement members, such that the mechanical linkage is actuated by movement of the one of the engagement members.

According to another aspect, the engagement members may engage an outer perimeter of a tire.

According to an aspect, there is provided a method of handling a tire, the method comprising the steps of positioning a device for handling tires comprising an anchor attached to a prime mover in proximity to a tire, the device for handling tires further comprising a clamping device rotatably mounted to the anchor, the clamping device comprising a carrying body, a plurality of engagement members, the plurality of engagement members being connected by a mechanical linkage, the carrying body comprising a plurality of guides, the clamping device having a weight distribution that is balanced about the axis of rotation, wherein the guides are distributed circumferentially about the axis of rotation, each guide carrying one of the plurality of engagement members, and the mechanical linkage comprises a rotating actuator that rotates about the axis of rotation relative to the carrying body and the anchor, moving the device for handling tires to position the engagement members adjacent to an outer surface of the tire, actuating an actuator connected to the mechanical linkage to cause the mechanical linkage to rotate, rotation of the mechanical linkage causing the engagement members to move along the guides a direction that is perpendicular to the axis of rotation from a release position to a clamping position engaging the outer surface of the tire, the mechanical linkage controlling the movement of the engagement members along the guides, the movement of each engagement member being rotationally symmetric about the axis of rotation relative to the movement of the other engagement members, moving the tire to a desired location using the prime mover, actuating the actuator to cause the mechanical linkage to rotate to cause the engagement members to move from the clamping position to the release position disengaged from the outer surface of the tire, and removing the device for handling tires from adjacent to the outer surface of the tire.

According to another aspect, moving the tire to a desired location may further comprise rotating the clamping device about an axis of rotation relative to the anchor to rotationally position the tire.

According to another aspect, the anchor may comprise a pivot, and the method may further comprise the step of pivoting the clamping device relative to the prime mover about a pivot axis that is perpendicular to the axis of rotation.

According to another aspect, the anchor may comprise a releasable pivot lock, and moving the tire to a desired location may further comprise the steps of releasing the pivot lock, pivoting the clamping device about the pivot axis to pivotally position the tire, and locking the pivot in a selected pivotal position.

According to another aspect, the guides may comprise arms that extend outward relative to the axis of rotation, and the engagement members may comprise sleeves that receive the arms.

According to another aspect, the guides may be linear.

According to another aspect, the mechanical linkage may comprise a rotating plate and a connecting link connected between the rotating plate and each engagement member, the connecting links converting the rotational movement of the rotating plate to linear movement of the engagement members along the guides.

According to another aspect, the actuator may be a linear actuator.

According to another aspect, the linear actuator may be connected between the carrying body and one of the engagement members, such that the mechanical linkage is actuated by movement of the one of the engagement members.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
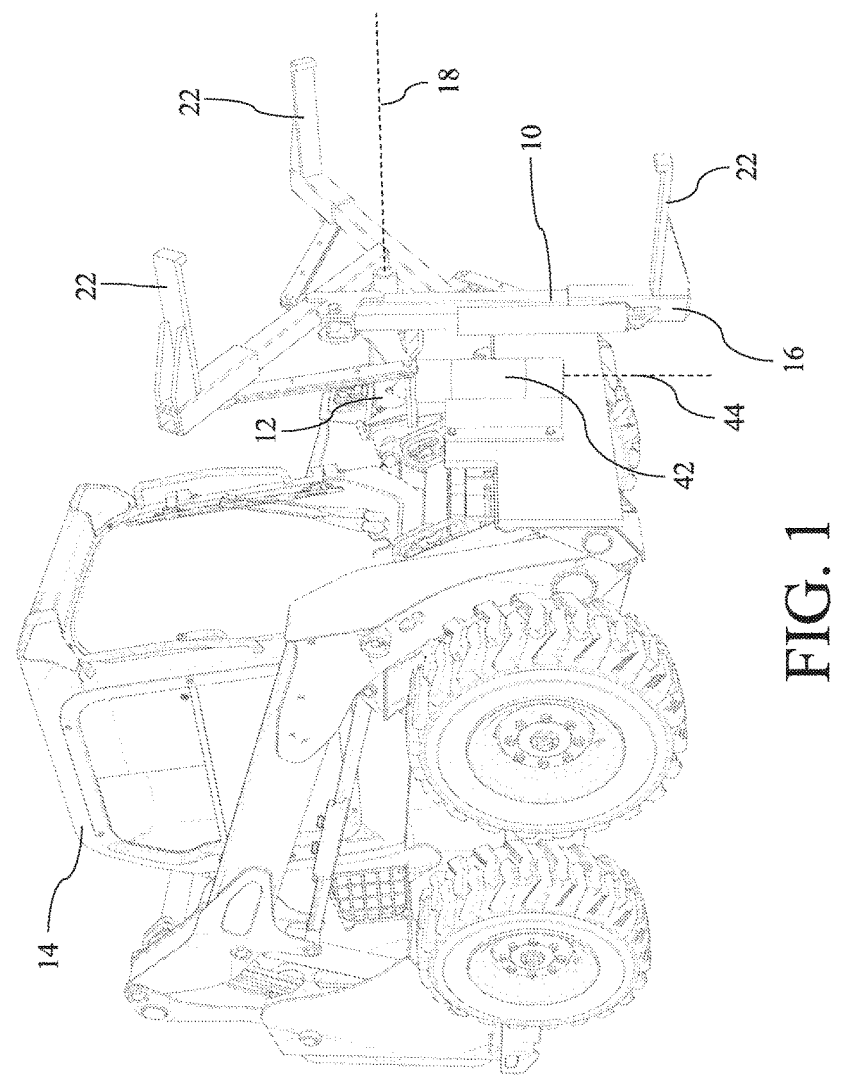
FIG. 1 is a perspective view of a device for handling tires attached to a skidsteer.

A device for handling tires, generally identified by reference numeral 10, will now be described with reference to FIGS. 1 through 8.

Referring to FIG. 1, device for handling tires 10 is mounted to a prime mover 14 by an anchor 12. As shown, prime mover 14 is a skidsteer. However, it will be understood that prime mover 14 may be any appropriate type of machinery, such as a telehandler, which may be more appropriate when handling larger tires. In some circumstances, where device 10 is used to handle larger tires, prime mover 14, and anchor 12 may form either a releasable attachment, designed to be accommodated by the intended prime mover, or may be integrally formed with prime mover 14. A clamping device 16 is rotatably mounted to anchor 12 and rotates about an axis of rotation 18 relative to anchor 12. As discussed below, clamping device 16 clamps on to a tire, and allows it to be manipulated. Clamping device 16 has a carrying body 20 and a plurality of engagement members 22.

Figure 2:
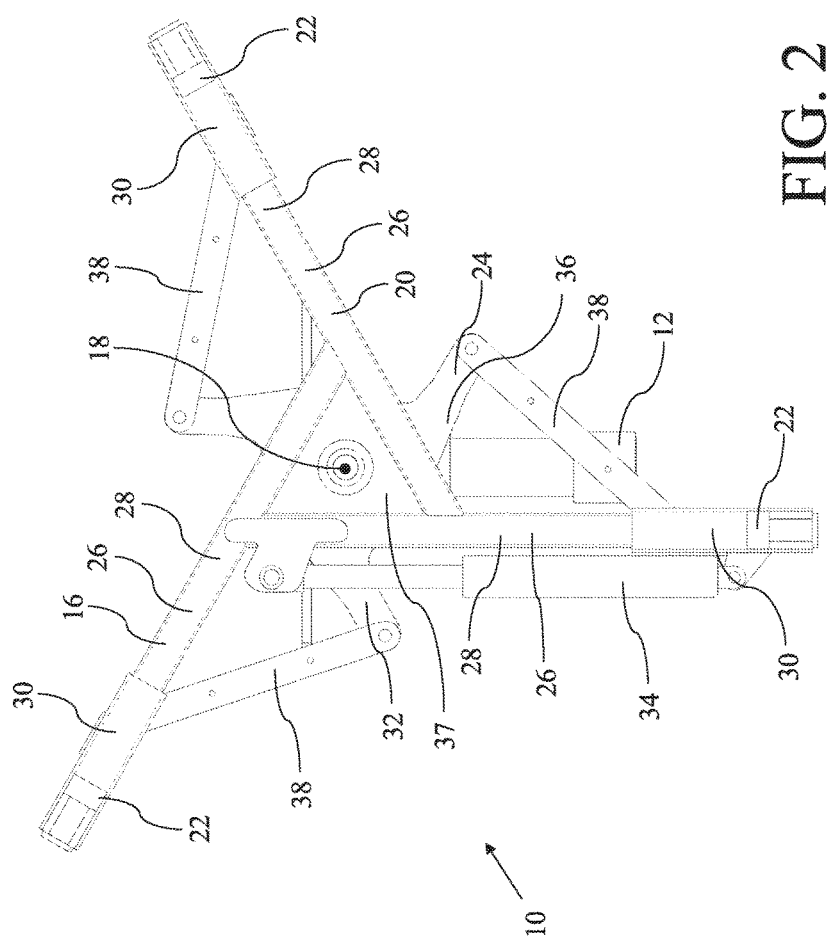
FIG. 2 is a front elevation view of a device for handling tires in a release position.
Figure 3:
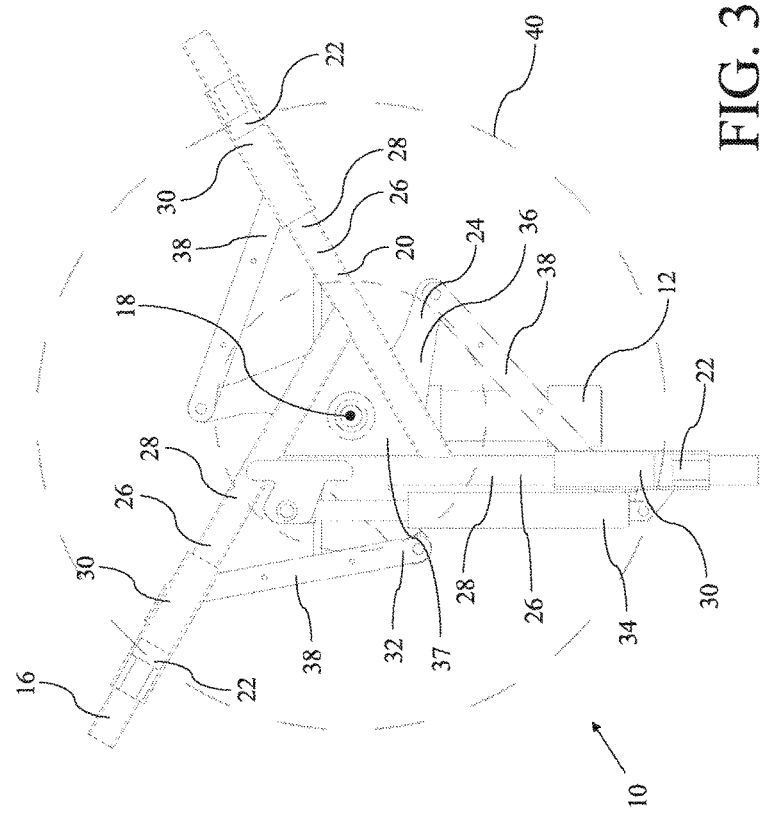
FIG. 3 is a front elevation view of the device for handling tires of FIG. 2 in a clamping position.

Referring to FIG. 2, carrying body 20 has a plurality of guides 26 that are distributed circumferentially about axis of rotation 18 in such a way as to provide a weight distribution that is balanced about axis of rotation 18. Preferably, there are three guides 26 and engagement members 22, as this design provides a secure attachment around the tire, although there may be any number that permits a tire to be properly gripped. Each guide 26 carries one of the engagement members 22, and guides 26 are oriented to allow engagement members 22 to move perpendicular to axis of rotation 18 between a clamping position as shown in FIG. 3, and a release position as shown in FIG. 2. In the clamping position, engagement members 22 engage the tire to be handled. For example, engagement members 22 may engage an outer perimeter of a tire 40 as shown in FIG. 3. As shown, guides 26 are arms 28 mounted to a central plate 37, and are linear and extend outward relative to axis of rotation 18, and engagement members 22 have sleeves 30 that receive arms 28, such that the sleeves slide along arms 28. As shown, arms 28 and sleeves 30 are square tubing, which prevents engagement members 22 from rotating around arms 28. It will be understood that guides 26 may take different forms or shapes, such as being curved, be distributed asymmetrically, use spring members as guides 26, have engagement members 22 internally engage guides 26, etc. For manufacturing and design purposes, a simpler design, such as the depicted design, is preferred. Furthermore, in any design, the weight distribution of carrying body is preferably balanced about axis of rotation 18 is balanced, and counterweights or other balancing devices may be used to provide the necessary weight distribution. Providing a balanced weight distribution may aid in manipulating the tire, and ensuring that the tire stays in a selected rotational position and is centred upon installation without the need for additional clamps or actuators acting on carrying body 20 itself.

Figure 4:
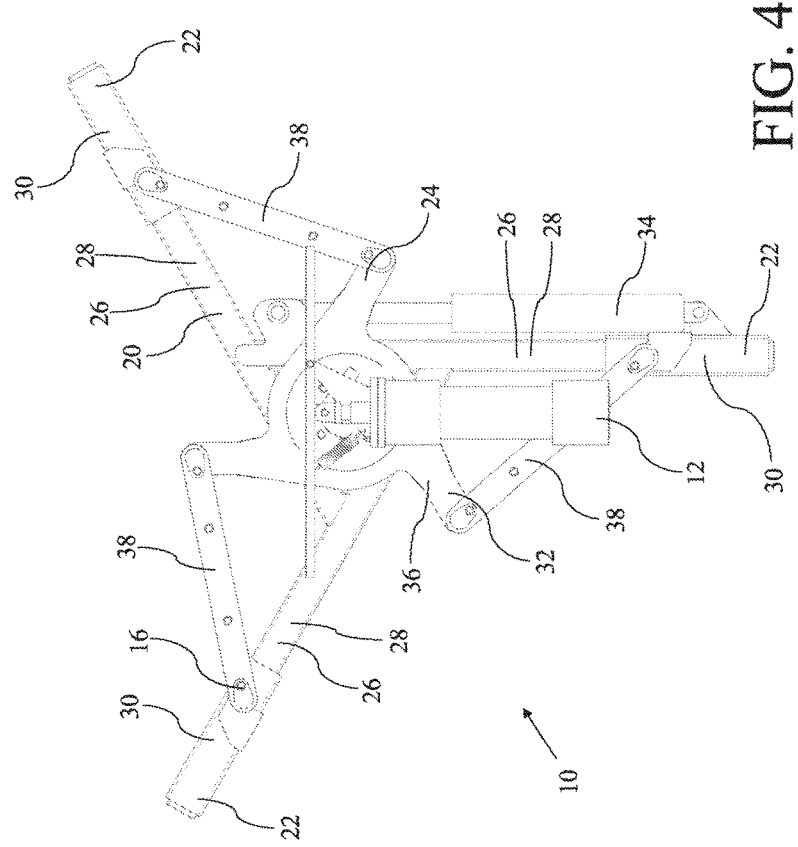
FIG. 4 is a rear elevation view of the device for handling tires of FIG. 2.
Figure 5:
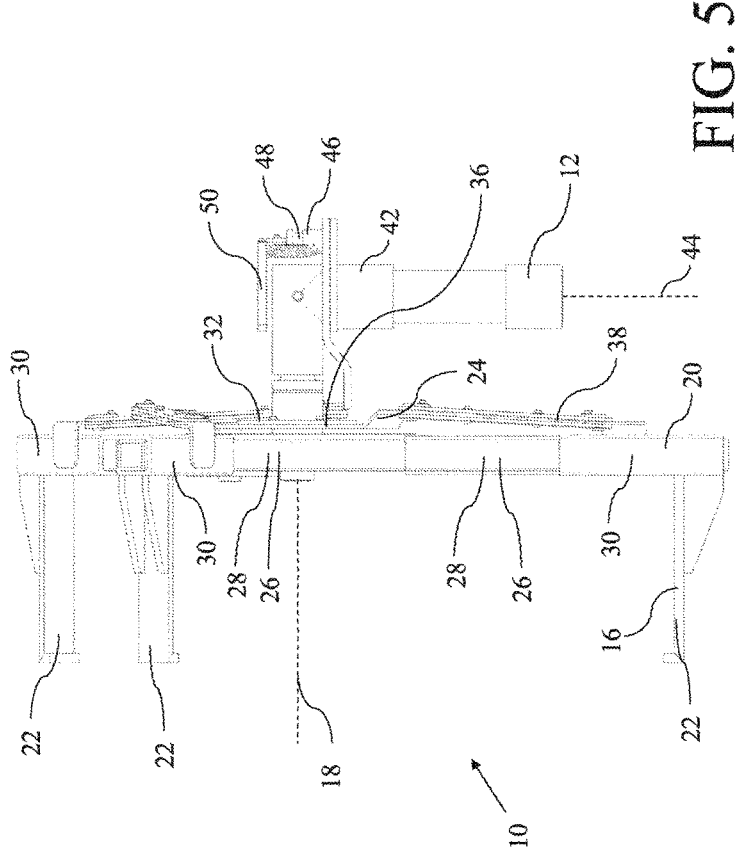
FIG. 5 is a side elevation view of the device for handling tires of FIG. 2 with a pivot lock in a locked position.
Figure 6:
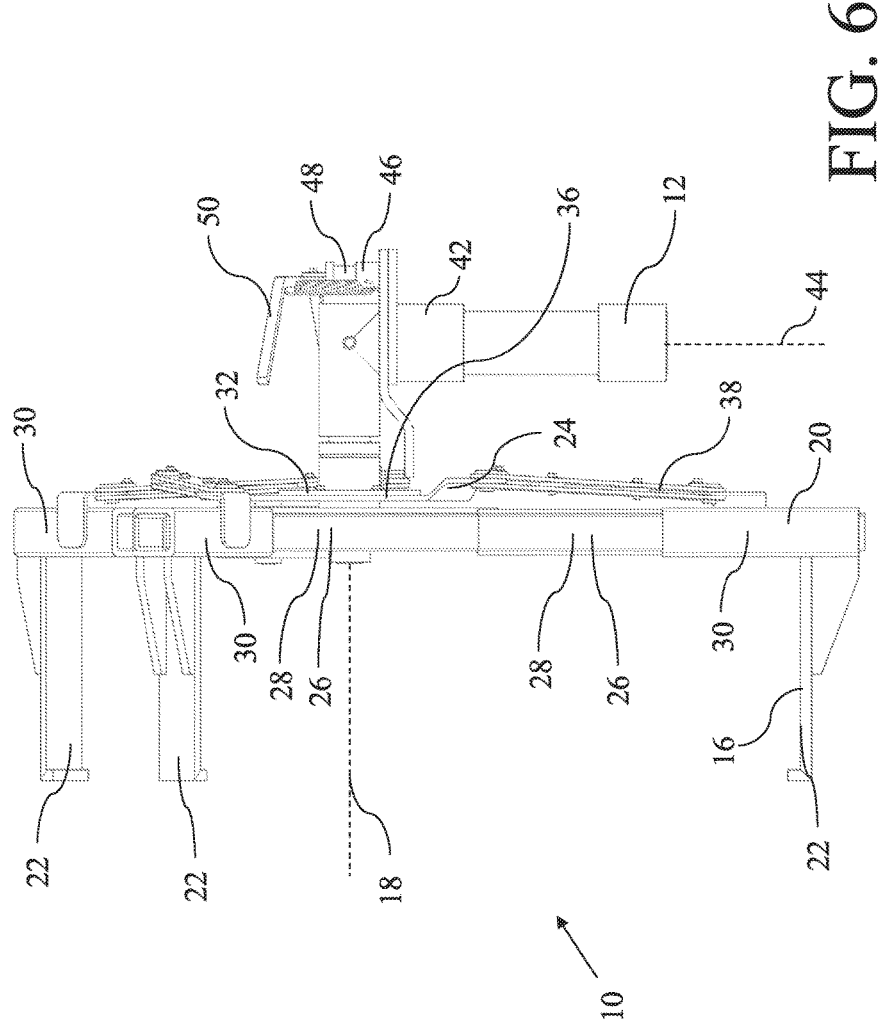
FIG. 6 is a side elevation view of the device for handling tires of FIG. 2 with a pivot lock in a released position.

Referring to FIG. 4, engagement members 22 are connected by a mechanical linkage 24. Mechanical linkage 24 comprises a rotating actuator 32 that rotates about axis of rotation 18 relative to carrying body 20 and anchor 12. Mechanical linkage 24 controls the movement of engagement members 22 along guides 26, the movement of each engagement member 22 being rotationally symmetric about axis of rotation 18 relative to the movement of the other engagement members 22. This allows all of the engagement members 22 to be moved between the clamping and release position evenly. As shown, mechanical linkage 24 is a rotating plate 36 and is connected between rotating plate 36 and each engagement member 22 by a connecting link 38. Connecting links 38 convert the rotational movement of rotating plate 36 to linear movement of engagement members 22 along guides 26.

Referring to FIG. 2, an actuator 34 actuates mechanical linkage 24. As shown, actuator 34 is a linear actuator, such as a hydraulic cylinder, connected between carrying body 20 and one of the engagement members 22, such that mechanical linkage 24 is actuated by movement of the one of the engagement members 22. Linear actuator 34 could be replaced with other types actuators, such as a gear and pinion drive, a worm gear arrangement, etc., that allows the movement of mechanical linkage 24 to be controlled. Actuation of linear actuator 34 causes the cylinder to extend or withdraw the connected engagement member 22 along guide 26. The connecting link 38 applies a force to rotating plate 36, converting the linear movement of linear actuator 34 applied to engagement member 22 into a rotational force. This force is then distributed to the remaining connecting links 38, which will then move the other engagement members 22 along the other guides 26, causing all of the engagement members 22 to move in unison. As linear actuator 34 is positioned on only one of the arms 28 of carrying body 20, it may cause the weight distribution to be altered. Therefore, linear actuator 34 as provided will either have a sufficiently small weight as to not influence the weight distribution in a significant manner, i.e., insufficient to overcome the rotational friction inherent in clamping device 16, or counter weights may be provided on carrying body 20 to maintain the symmetrical weight distribution.

Figure 7:
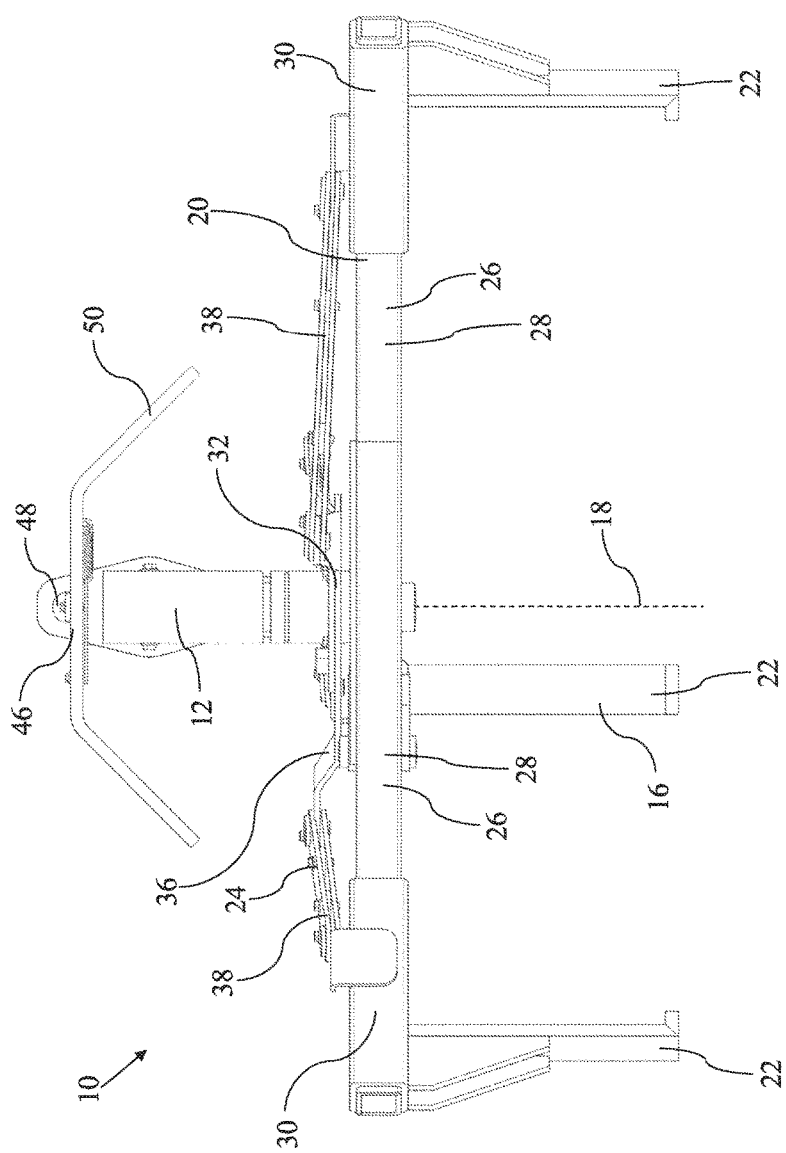
FIG. 7 is a top plan view of the device for handling tires of FIG. 2.
Figure 8:
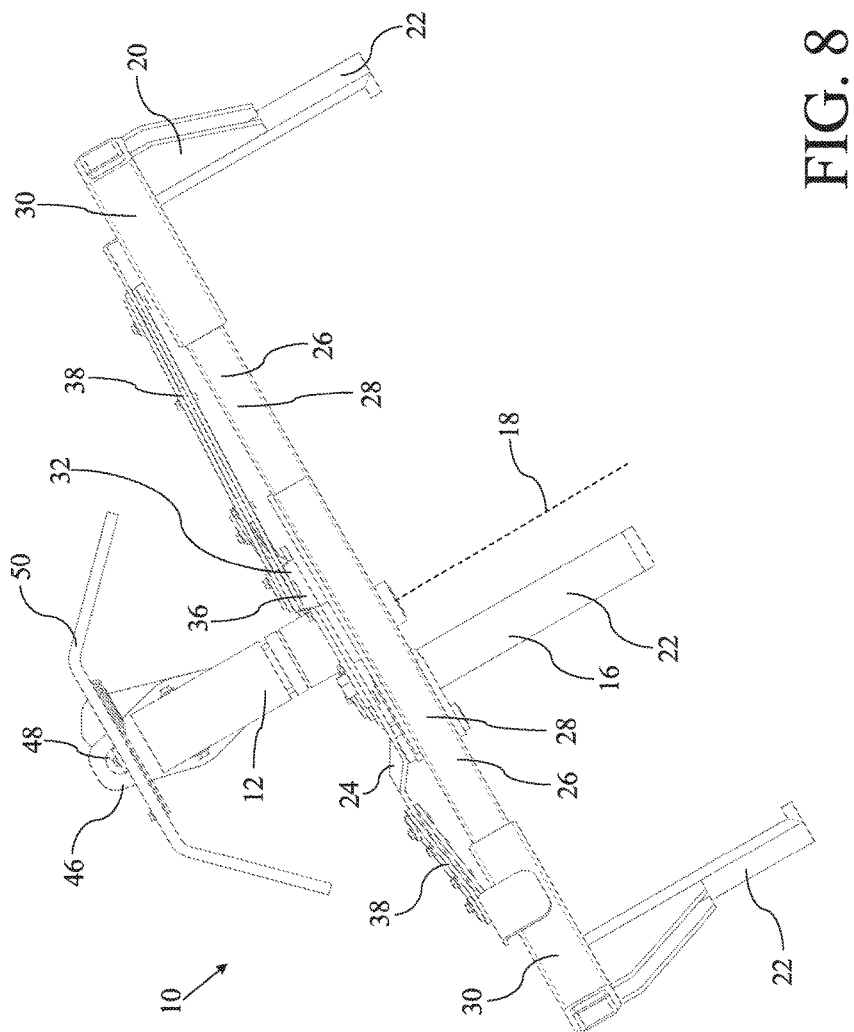
FIG. 8 is a top plan view of the device for handling tires of FIG. 2 that has been pivoted from the position shown in FIG. 7.

Referring to FIG. 7 and FIG. 8, anchor 12 may have a pivot 42 such that clamping device 16 is pivotally mounted to prime mover 14. This allows the position of clamping device 16 to be adjusted without having to reposition prime mover 14. As shown, pivot 42 has a pivot axis 44 that is perpendicular to axis of rotation 18, vertically oriented, and moves with the hydraulic arms of prime mover 14. Anchor 12 and pivot 42 should be designed to avoid unintended movement while using clamping device 16. As shown, pivot axis 44 will remain in a vertical plane as the hydraulic arms of prime mover 14 move, and also has a releasable pivot lock 46 for locking pivot 42 in a selected pivotal position. Pivot lock 46 is depicted as a pin connection 48 having a biased release lever 50, pin connection 48 being formed with a number of lock positions on the anchor 12.

Referring to FIG. 1, with the device 10 installed on prime mover 14, device 10 is moved into proximity with a tire to be handled. Referring to FIGS. 2 and 3, engagement members 22 are moved by mechanical linkage 24 such that they are adjacent to and engage the outer perimeter 40 of a tire. It will be understood that in the process of moving device 10, clamping device 16 may also be rotated about axis of rotation 18, and anchor 12 may be pivoted about pivot axis 44 in order to better position the tire. Once the engagement members 22 are in position, actuator 34 is actuated to cause mechanical linkage 24 to rotate, which in turn causes engagement members 22 to move along guides 26 in a direction perpendicular to axis of rotation 18, as shown in FIG. 2 and FIG. 3. Engagement members 22 then move from a release position to a clamping position engaging the outer surface of the tire. Prime mover 14 then moves the tire to a desired location, and actuator 34 can then be used to cause mechanical linkage 24 to rotate, either in the opposite direction or continuing in the same direction, depending on the form of mechanical linkage 24, to cause engagement members 22 to move from the clamping position to the release position disengaged from the outer surface of the tire. Device 10 can then be removed from adjacent to the outer surface of the tire. It will be understood that when moving the tire to a desired location, clamping device 16 may also be rotated about axis of rotation 18, and anchor 12 may be pivoted about pivot axis 44, as above. When anchor 12 has a pivot lock 46, pivoting anchor 12 will require a user to release pivot lock 46, pivoting clamping device 16 about pivot axis 44 to pivotally position the tire, and lock pivot 42 in a selected pivotal position. Rotating clamping device 16 about axis of rotation 18 relative to anchor 12 rotationally positions the tire, and may, for example, be used to rotate the tire to align with bolts on the vehicle receiving the tire. As clamping device 16 is balanced, this can be accomplished by a worker by hand, allowing the user to make fine adjustments to the rotational position of the tire by hand, while pivoting clamping device 16 relative to prime mover 14 will position the tire on the horizontal plane, and may, for example, be used to position the tire when prime mover 14 is limited by the terrain or other obstacle. Device 10 may be equipped with a camera or other visual aids (not shown) to help with positioning the tire when an operator cannot easily see the hub of the vehicle. It will be understood that during any of the moving steps described above, prime mover 14 may also move the tire in different directions. For example, when prime mover 14 is a skid steer as shown in FIG. 1, anchor 12 is generally mounted to an attachment that is able to pivot forward and backward, allowing the tire to be moved between vertical and horizontal positions.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A device for handling tires, comprising:
an anchor for attaching to a prime mover;
a clamping device rotatably mounted to the anchor, the clamping device being rotatable about an axis of rotation relative to the anchor, the clamping device comprising a carrying body and a plurality of engagement arms distributed circumferentially about the axis of rotation, each of the plurality of engagement arms comprising a guide, a guide path defined by the guide, and an engagement member, the engagement member moving along the guide path between a clamping position and a release position the clamping device having a weight distribution that is balanced about the axis of rotation;
a mechanical linkage that connects the engagement members of each of the plurality of engagement arms, the mechanical linkage comprising a rotating plate that rotates about the axis of rotation relative to the carrying body and the anchor, and for each engagement member a connecting link that connects between the rotating plate and the engagement member, the connecting links converting the rotational movement of the rotating plate to linear movement of the engagement members along the guides as the rotating plate rotates, the movement of each engagement member being rotationally symmetric about the axis of rotation relative to the movement of the other engagement members; and
a linear actuator that is directly connected between one of the engagement members and the carrying body, the linear actuator extending parallel to the guide path of the one of the engagement members, the linear actuator being intersected by and extending parallel to a plane that also intersects each of the guides, wherein the linear actuator actuates the mechanical linkage by actuating the one of the engagement members.

2. The device of claim 1, wherein the guides are linear.

3. The device of claim 1, wherein the linear actuator is connected between the carrying body and one of the engagement members, such that the mechanical linkage is actuated by movement of the one of the engagement members.

4. The device of claim 1, wherein the engagement members engage an outer perimeter of a tire.

5. A method of handling a tire, the method comprising the steps of:
positioning a device for handling tires comprising an anchor attached to a prime mover in proximity to a tire, the device for handling tires further comprising:
a clamping device rotatably mounted to the anchor about an axis of rotation, the clamping device comprising a carrying body, a plurality of arms distributed circumferentially about the axis of rotation, each of the plurality of engagement arms comprising a guide, a guide path defined by the guide, and an engagement member, the engagement member moving along the guide path between a clamping position and a release position, the clamping device having a weight distribution that is balanced about the axis of rotation; and
a mechanical linkage that connects the engagement members of each of the plurality of engagement arms, the mechanical linkage comprising a rotating plate that rotates about the axis of rotation relative to the carrying body and the anchor and for each engagement member a connecting link that connects between the rotating plate and the engagement member, the connecting links converting the rotational movement of the rotating plate to linear movement of the engagement members along the guides;

a linear actuator that is directly connected between one of the engagement members and the carrying body such that the linear actuator actuates the mechanical linkage by actuating the one of the engagement members, the linear actuator extending parallel to the guide path of the one of the engagement members, the linear actuator being intersected by and extending parallel to a plane that also intersects each of the guides;

moving the device for handling tires to position the engagement members adjacent to an outer surface of the tire by permitting free pivotal movement of the clamping device about the axis of rotation relative to the prime mover to align the clamping device with the tire;

actuating the linear actuator to cause the engagement members to move along the guide paths in directions that are perpendicular to the axis of rotation from the release position to the clamping position engaging the outer surface of the tire, the linear actuator actuating the rotating actuator and the other engagement members via the one of the engagement members, the movement of each engagement member being rotationally symmetric about the axis of rotation relative to the movement of the other engagement members;

moving the tire to a desired location using the prime mover;

actuating the linear actuator to cause the mechanical linkage to rotate to cause the engagement members to move from the clamping position to the release position disengaged from the outer surface of the tire; and removing the device for handling tires from proximity to the tire.

6. The method of claim 5, wherein the anchor comprises a pivot, and the method further comprises the step of pivoting the clamping device relative to the prime mover about a pivot axis that is perpendicular to the axis of rotation of the clamping device.

7. The method of claim 6, wherein the pivot comprises a releasable pivot lock, and wherein moving the tire to a desired location further comprises the steps of:
releasing the releasable pivot lock;
pivoting the clamping device about the pivot axis to pivotally position the tire; and
locking the pivot in a selected pivotal position.

8. The method of claim 5, wherein the guides are linear.

9. The method of claim 5, wherein the linear actuator is connected between the carrying body and one of the engagement members, such that the mechanical linkage is actuated by movement of the one of the engagement members.

10. The device of claim 1, wherein the anchor comprises a pivot that permits pivotal movement between the prime mover and the clamping device, the pivot having a locked configuration and an unlocked configuration, wherein, in the unlocked configuration, the clamping device permits free pivotal movement of the clamping device relative to the prime mover.

11. The device of claim 10, wherein the pivot comprises a releasable pivot lock that changes the configuration between the locked configuration and the unlocked configuration, the releasable pivot lock locking the pivot in a selected pivotal position.

12. The device of claim 10, wherein the pivot has a pivot axis that is perpendicular to the axis of rotation.

* * * * *